UNITED STATES PATENT OFFICE.

HEINRICH DANNEEL AND EMIL KUHN, OF BASEL, SWITZERLAND, ASSIGNORS TO ELEKTRIZITÄTSWERK LONZA, OF GAMPEL, SWITZERLAND.

PROCESS FOR OXIDIZING AMMONIUM SULFITE TO AMMONIUM SULFATE.

1,274,247.  Specification of Letters Patent.  Patented July 30, 1918.

No Drawing.  Application filed July 21, 1917.  Serial No. 182,040½.

*To all whom it may concern:*

Be it known that we, HEINRICH DANNEEL, chemist, a subject of the Grand Duke of Mecklenburg-Schwerin, and resident of Basel, Switzerland, and EMIL KUHN, chemist, a citizen of the Swiss Republic, and resident of Basel, Switzerland, have invented Processes for Oxidizing Ammonium Sulfite to Ammonium Sulfate, of which the following is a full, clear, and exact specification.

It is known that alkali sulfites, including ammonium sulfite, can be oxidized by oxygen or air to sulfates. When air is used the oxidation proceeds very slowly, and as ammonium sulfite is fundamentally hydrolyzed in aqueous solution, the nitrogen of the air carries away ammonia. Once oxidation to sulfate has occurred, however, loss of ammonia is no longer to be feared, since the sulfate suffers little hydrolysis. It is therefore advantageous that the oxidation should be as rapid as possible.

By this invention a sparingly soluble sulfate, such as calcium sulfate, can act as an oxygen-carrier for the oxidation in question. Thus, when ammonium sulfite solution is passed over gypsum, owing to the fact that calcium sulfite is more sparingly soluble than the sulfate, there happens immediately a double decomposition according to the equation—

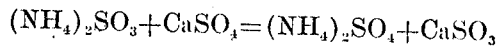

The oxidation may now proceed slowly without danger of loss.

But we have found that calcium sulfite can be oxidized far more easily and quickly to sulfate than ammonium sulfite can, so that the addition of calcium sulfate presents a double advantage, first the immediate suppression of the hydrolyzed $(NH_4)_2SO_3$, that is to say the prevention of loss of ammonia, and secondly, the acceleration of the process of oxidation, that is to say a saving of time.

From the foregoing it is obvious that when an ammonium sulfite solution is passed over gypsum contained in a chamber, while air is simultaneously introduced in the said chamber, the ammonium sulfite will be immediately transformed into ammonium sulfate according to the above indicated equation, while the calcium sulfite simultaneously formed according to the said equation will also immediately be reoxidized by the oxygen of the air to calcium sulfate according to the equation

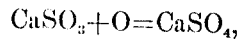

so that only a little quantity of gypsum will be necessary to insure the transformation of an unlimited quantity of ammonium sulfite into ammonium sulfate, the same quantity of gypsum acting continually as an oxygen carrier, that is to say for transmitting the oxygen from the air unto the ammonium sulfite.

What we claim is:

1. A process for oxidizing ammonium sulfite to ammonium sulfate by air, wherein the oxidation is conducted in presence of a sparingly soluble sulfate.

2. A process for oxidizing ammonium sulfite to ammonium sulfate by air, wherein the oxidation is conducted in presence of calcium sulfate.

In witness whereof we have hereunto signed our names this 15th day of March, 1917, in the presence of two subscribing witnesses.

HEINRICH DANNEEL.
EMIL KUHN.

Witnesses:
ANNA ARBERT,
AMAND RITTER.